(12) United States Patent
Masjedi

(10) Patent No.: US 10,231,525 B2
(45) Date of Patent: Mar. 19, 2019

(54) ERGONOMICALLY CONFIGURED HANDLE APPARATUS FOR PERIPHERAL DEVICE

(71) Applicant: Nayrika D. Masjedi, Los Angeles, CA (US)

(72) Inventor: Nayrika D. Masjedi, Los Angeles, CA (US)

( * ) Notice: Subject to any disclaimer, the term of this patent is extended or adjusted under 35 U.S.C. 154(b) by 0 days.

(21) Appl. No.: 15/485,807

(22) Filed: Apr. 12, 2017

(65) Prior Publication Data

US 2018/0332941 A1  Nov. 22, 2018

(51) Int. Cl.
*H04B 5/00* (2006.01)
*A45C 13/26* (2006.01)
*H04B 1/3827* (2015.01)

(52) U.S. Cl.
CPC ........... *A45C 13/26* (2013.01); *H04B 1/3827* (2013.01); *H04B 1/385* (2013.01); *H04B 5/00* (2013.01)

(58) Field of Classification Search
CPC ........ H04B 1/3827; H04B 1/385; H04B 5/00; G06F 3/014
See application file for complete search history.

(56) References Cited

U.S. PATENT DOCUMENTS

| | | | |
|---|---|---|---|
| 6,681,638 B2 * | 1/2004 | Kazerooni | B65G 43/00 254/266 |
| 9,592,433 B2 * | 3/2017 | Alleshouse | A63B 69/125 |
| 2015/0237181 A1 * | 8/2015 | Khan | H04M 1/0202 455/556.1 |

* cited by examiner

*Primary Examiner* — Tuan Pham
(74) *Attorney, Agent, or Firm* — Williams Intellectual Property; Benjamin F. Williams

(57) ABSTRACT

An ergonomically configured handle apparatus for peripheral device includes a contact surface devised to selectively secure to a peripheral device. A thenar contact portion and a digital contact portion are ergonomically configured for comfortable wielding of the peripheral device attached at the contact surface. Each of a user's digits is accommodated recessed into each of a first and second obverse surface proximal the contact surface, whereby the distal phalanxes of a user's digits do not contact or impede attachment of the peripheral device to the apparatus. A tactile cursor control is provided having at least one directionally sensitive member and at least one button disposed upon the apparatus in position appropriate for control by the user's digits grasping the apparatus. Single-handed operation and wielding of the attached peripheral device is thereby enabled by one hand of the user.

18 Claims, 6 Drawing Sheets

ERGONOMICALLY CONFIGURED HANDLE APPARATUS FOR PERIPHERAL DEVICE

BACKGROUND OF THE INVENTION

Various types of handles, supports, bases, and stands devised for attachment to uphold a peripheral device are known in the prior art. Most are passive devices, devised merely to attach to the peripheral device and enable readier grasping and portage of the peripheral device by a user. Such devices typically include a protuberence of some kind readily secured to the rear side of the peripheral device and are often devised of polymer, inexpensive to produce and retail.

Most are not particularly configured for ergonomic graspability or tactility when wielding a peripheral device, nor enable single-handed operation of the peripheral device to which they are attached.

What is needed is an ergonomically configured handle apparatus for peripheral device that is ergomoinically configured for single-handed wielding of an attached peripheral device, said apparatus connectable in Near Field Communication with said attached peripheral device for single-handed operation thereof. A thenar contact portion and a digital contact portion is provided, devised for ergonomic engagement against the thenar, thumb, the distal palmer, and fingers of a user, whereby said user may comfortable wield the attached peripheral device in one hand. A tactile cursor control, disposed upon the apparatus in a position suitable for engagement and control by at least one digit of the user, further enables single-handed operation of the attached peripheral while grasping the apparatus.

FIELD OF THE INVENTION

The present invention relates to an ergonomically configured handle apparatus for peripheral device devised for expedient securement to a peripheral device to enable single-handed wielding and operation thereof. The present ergonomically configured handle apparatus for peripheral device, therefore, includes a contact portion devised to selectively secure to a peripheral device at a contact surface thereof. A thenar contact portion and a digital contact portion are radially projected on opposite sides of the contact portion for manual grasping by a user. The thenar contact portion includes a pollex recess disposed therein to accommodate the thumb of the user recessed into a first obverse surface whereby contact with the attached peripheral device against said user's thumb is preventable when grasping the apparatus. The digital contact portion includes a plurality of digital recesses serried thereupon, each of said plurality of digital recesses disposed to accommodate one of the user's fingers recessed into a second obverse surface, whereby the distal phalanx of each of said user's fingers is prevented from contacting the peripheral device attached to the contact portion at the contact surface. At least one tactile cursor control is disposed upon the apparatus in position suitable for manual engagement by at least one of the user's digits whereby single-handed operation of the attached peripheral device is enabled by a user grasping and wielding the apparatus. A user may thus port, wield, and operate an attached peripheral device single-handedly.

SUMMARY OF THE INVENTION

The present ergonomically configured handle apparatus for peripheral device has been devised to secure to a peripheral device and enable comfortable wielding in the hand of a user whereby single-handed operation of a peripheral device is enabled in the hand of a user.

The term "peripheral device", as used herein throughout, is taken to include all portable computing apparatuses connectable over network such as, for example, handhelds, tablets, smart phones, Personal Digital Assistants (PDAs), Wireless Communications Devices (WCDs), among other wirelessly connectable devices communicable by Near Field Communication protocol (NFC) for data transfer over network.

The present ergonomically configured handle apparatus for peripheral device, therefore, includes a contact portion disposed to engage against a peripheral device at a contact surface thereof. The contact surface may include a magnet or other means to effect selective securement of a peripheral device thereagainst, such as, for example, a suction cup, or a tractive surface devised to frictionally engage against a peripheral device and maintain said peripheral device in position as desired. The contact surface is disposed to secure to a peripheral device whereby said peripheral device extends over the contact portion beyond the limits of the contact surface, as will be described subsequently.

An irregular lens-shaped thenar contact portion is disposed radially projected from a first bridge portion, disposed to one side of the contact portion. The thenar contact portion is ergonomically configured for engagement against the thenar of a user when gripped by the user. The thenar contact portion includes a pollex recess, disposed to accommodate the thumb of the user recessed into a first obverse surface and a first lateral surface disposed upon the thenar contact portion, whereby the distal phalanx of the user's thumb does not impede attachment of the peripheral device to the contact portion by obtruding above said first obverse surface in proximity to the contact portion.

An irregularly crescent-shaped digital contact portion is disposed radially projected from a second bridge portion disposed upon the other side of the contact portion, opposite the thenar contact portion. The digital contact portion is ergonomically configured for engagement against the distal palmer of the user's hand and each of said user's fingers when grasped by the user. The digital contact portion includes a plurality of digital recesses disposed to accommodate a user's fingers therein, wherein each distal phalanx of each of the user's fingers is disposed recessed into a second obverse surface when grasped by the user, whereby unwanted contact with a peripheral device attached to the contact portion is preventable.

Attachment of the peripheral device to the contact surface of the contact portion may establish or prompt NFC communication of the peripheral device with the apparatus. Once connection is established, a user may operate the peripheral device by manual action exerted against at least one tactile cursor control disposed upon the apparatus in a position appropriate for engagement by at least one digit of the user. The at least one tactile cursor control may include at least one directionally sensitive member, disposed sensible of a user's manual movements through 360°, and at least one button depressible between a default position and a depressed position. Manual action exerted at the at least one directionally sensitive member is therefore communicable to navigate data displayable onscreen of the peripheral device and selection of data is enabled by depression of the at least one button.

The at least one tactile cursor control is contemplated to be disposed in the pollex recess and alternately in at least one of the plurality of digital recesses. A user may, for example, control the at least one directionally sensitive member by motions of the distal phalanx of said user's thumb to browse and navigate between data displayable upon the attached peripheral device, and effect selection and interaction with such data by depression of at least one button disposed, say, in one (or two) of the plurality of digital recesses, for example. Thus single-handed operation of the peripheral device is enabled in the hand of a user wielding the instant device.

For attachment to an object, and securement of an attached peripheral device thereaginst, a plurality of elongate flexible members is disposed upon the apparatus. Each of the plurality of elongate flexible members is securable between an extended position and a curled position. Each of the plurality of elongate flexible members may therefore be secured around an object when moved to the curled position.

The plurality of elongate flexible members includes a first elongate flexible member disposed endwise projected from a ball and socket joint disposed upon the thenar contact portion at a first lateral surface. The first elongate flexible member is therefore coaxially rotational about 360° at the ball and socket joint for deployment to attach to an object when moved to the curled position. The plurality of elongate members further includes a pair of second elongate flexible members disposed endwise projected from associated ball and socket joints disposed upon the digital contact portion at a second lateral surface thereof, in like manner as the first elongate flexible member is disposed upon the thenar contact portion, whereby each of the pair of second elongate flexible members is likewise deployable through 360° to wrap around an object for securement in the curled position.

The present apparatus is therefore usable to secure a peripheral device to an object around which each of the plurality of elongate flexible members is securable, such as, for example, a limb of a user. The plurality of elongate flexible members therefore enables securement to the body of a person for hands-free portage, when desired, or securement to an object accommodative of each of the plurality of elongate flexible members when moved to the curled position.

Thus has been broadly outlined the more important features of the present ergonomically configured handle apparatus for peripheral device so that the detailed description thereof that follows may be better understood and in order that the present contribution to the art may be better appreciated.

Objects of the present ergonomically configured handle apparatus for peripheral device, along with various novel features that characterize the invention are particularly pointed out in the claims forming a part of this disclosure. For better understanding of the ergonomically configured handle apparatus for peripheral device, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
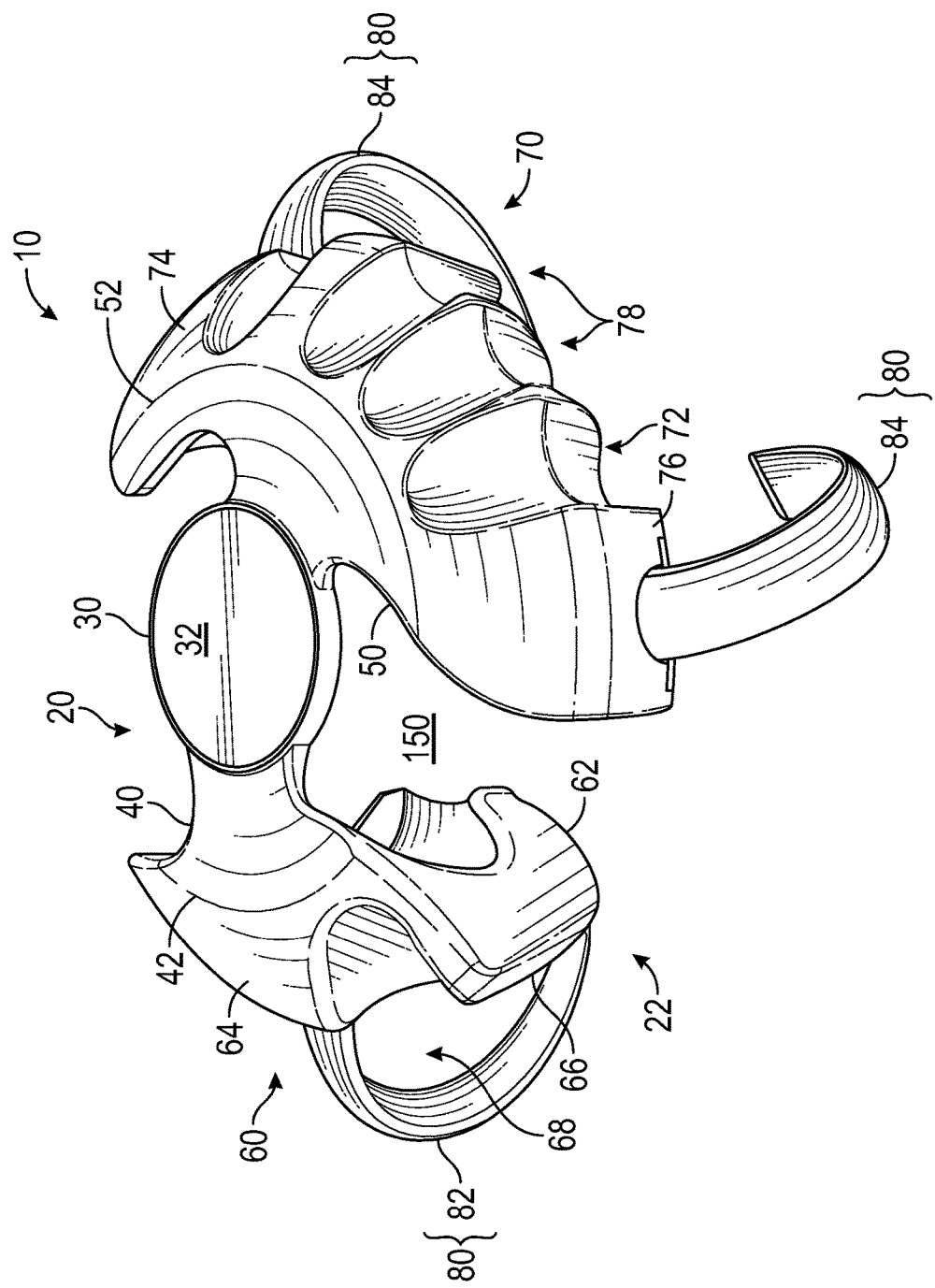
FIG. 1 is a raised elevation view of an example embodiment.
Figure 2:
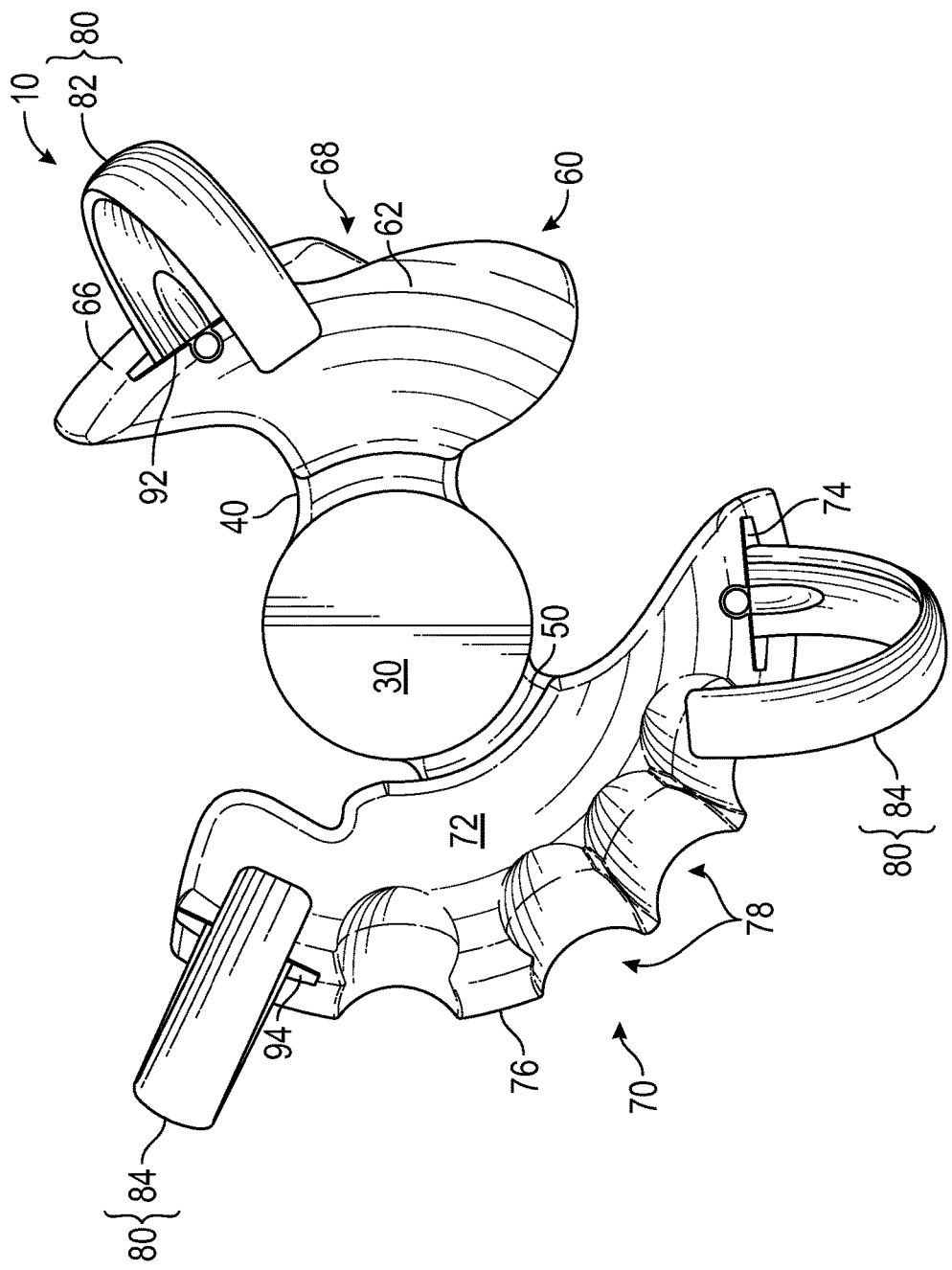
FIG. 2 is an elevation view of a reverse side of an example embodiment.
Figure 3:
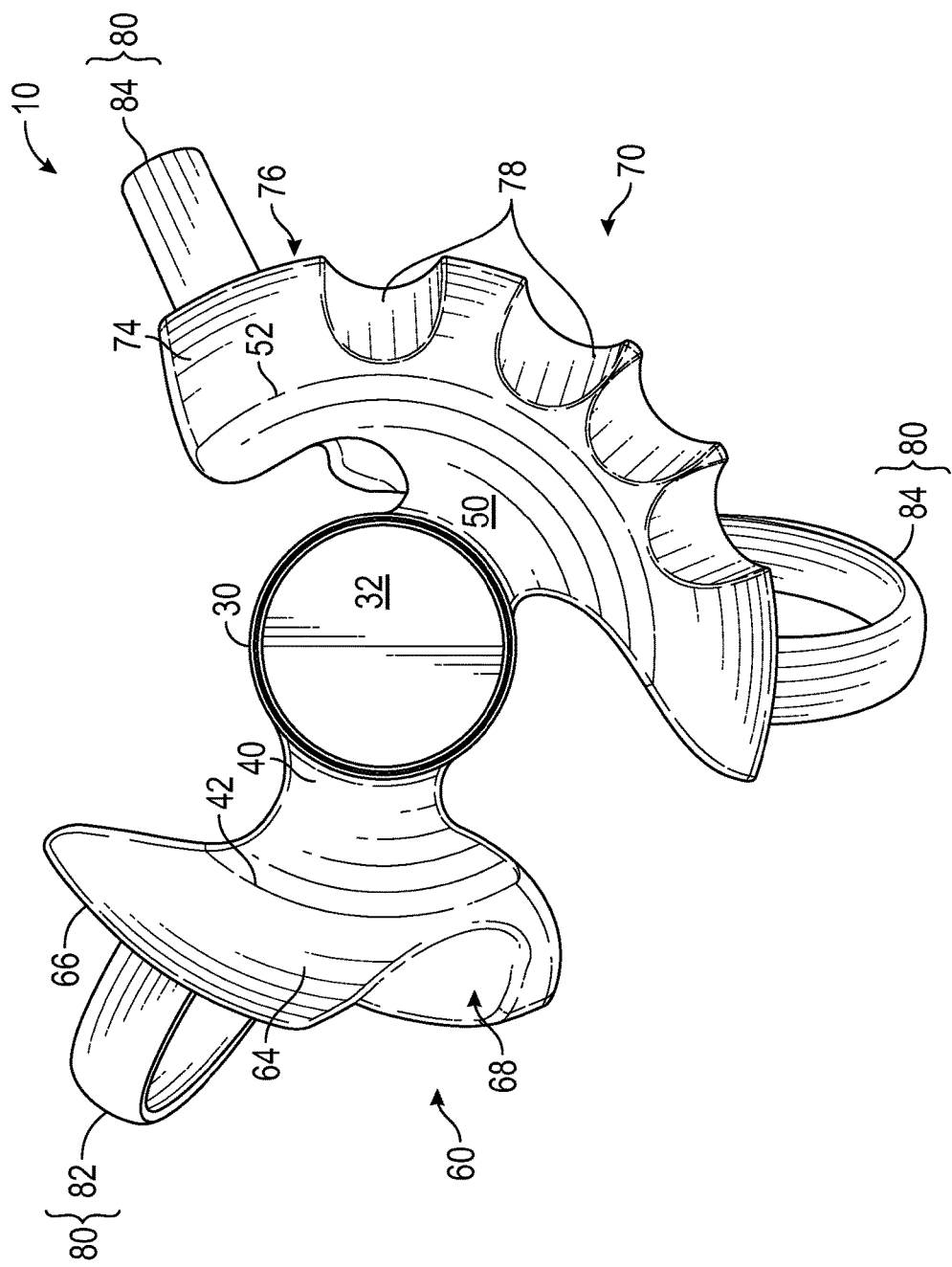
FIG. 3 is an elevation view of an obverse side of an example embodiment.
Figure 4:
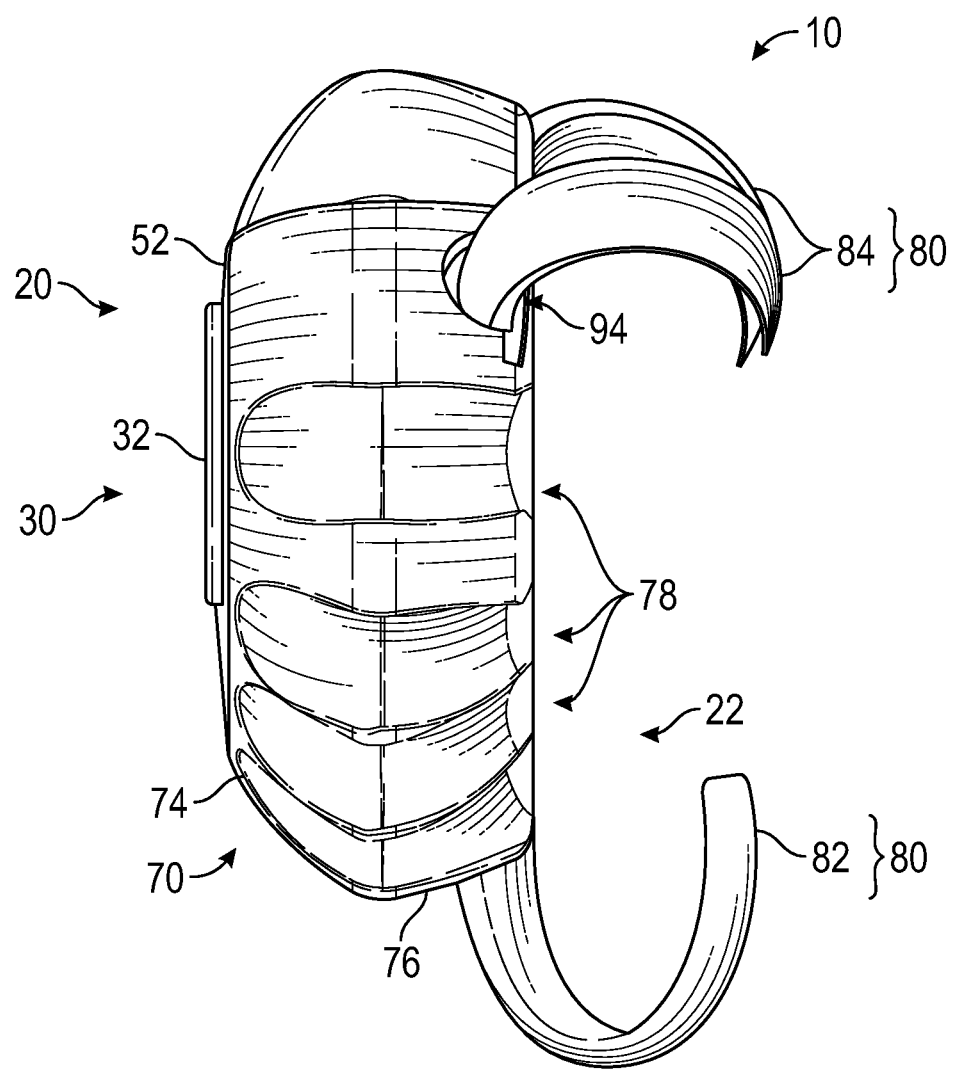
FIG. 4 is a side elevation view of an example embodiment.
Figure 5:
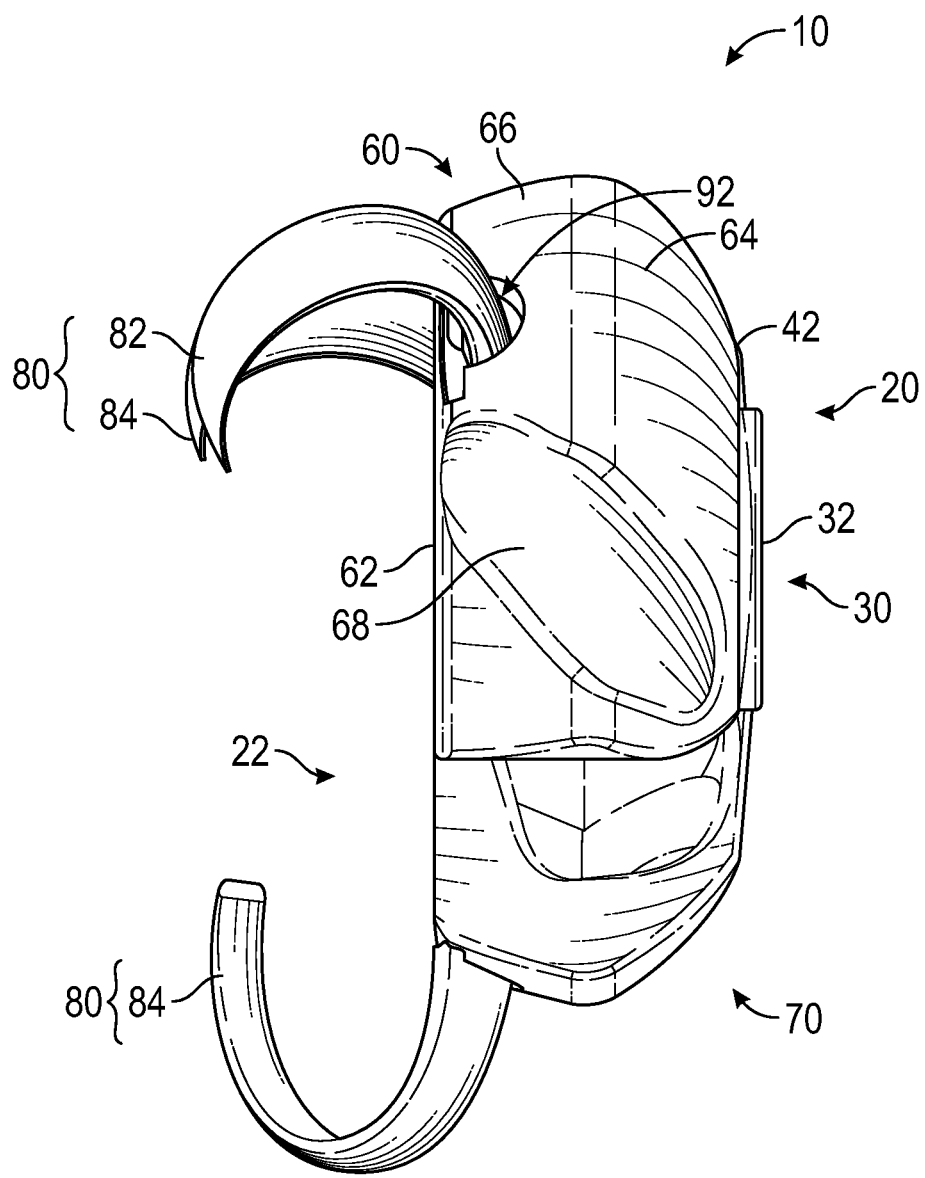
FIG. 5 is a side elevation view of an example embodiment.
Figure 6:
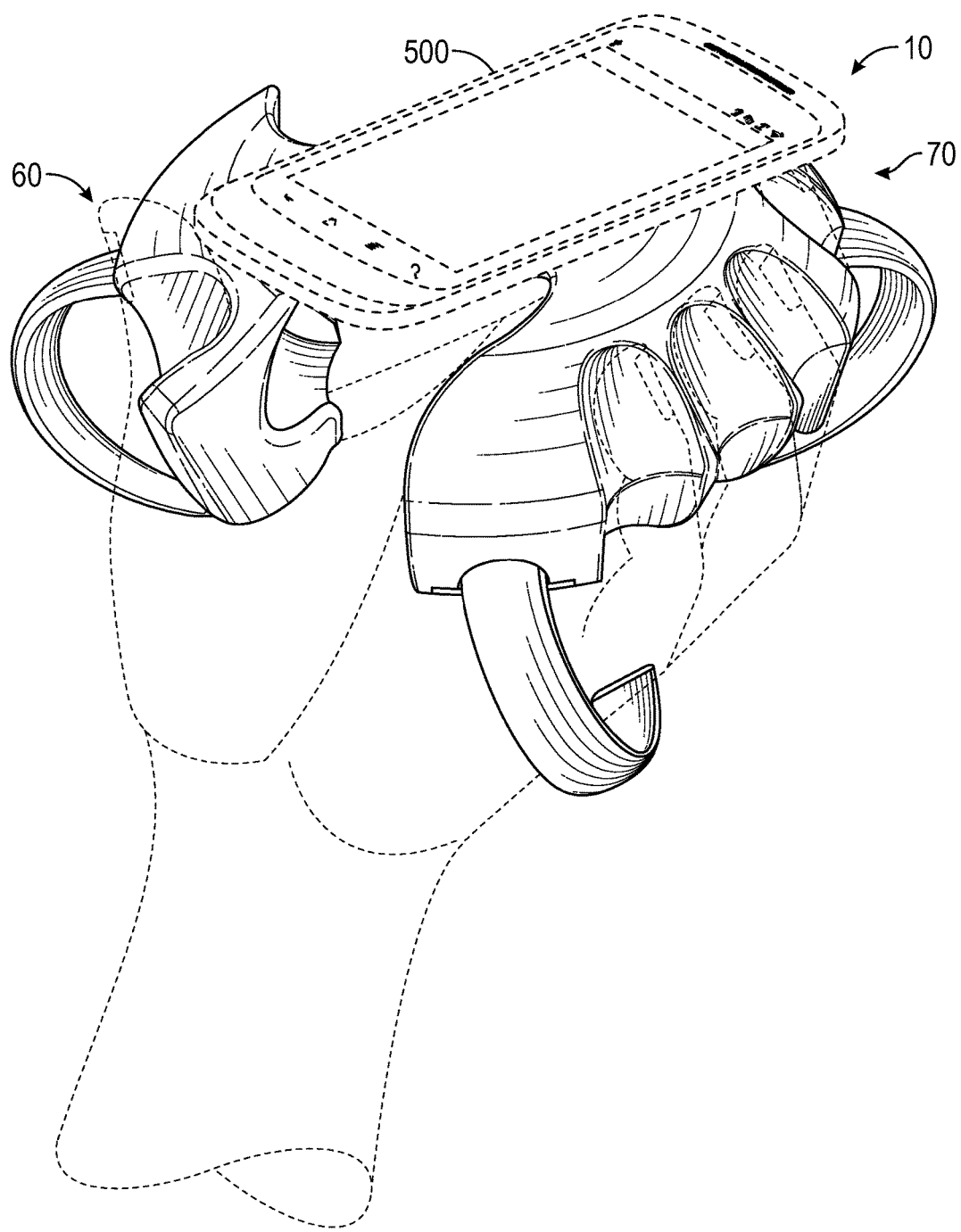
FIG. 6 is an in-use view of an example embodiment.

With reference now to the drawings, and in particular FIGS. 1 through 6 thereof, example of the instant ergonomically configured handle apparatus for peripheral device employing the principles and concepts of the present ergonomically configured handle apparatus for peripheral device and generally designated by the reference number 10 will be described.

Referring to FIGS. 1 through 6 a preferred embodiment of the present ergonomically configured handle apparatus for peripheral device 10 is illustrated.

The present ergonomically configured handle apparatus for peripheral device 10 has been devised to enable increased tactility of a peripheral device 500 when attached at a contact portion, whereby a user may wield the peripheral device by grasping an ergonomically configured thenar contact portion and digital contact portion without said user's digits directly contacting or impeding operation of the peripheral device. Further, the ergonomically configured handle apparatus for peripheral device is self-standing, when occasion demands, whereby a user may place an attached peripheral device at an elevated situation above a surface for viewing and operating the peripheral device as desired. Lastly, the ergonomically configured handle apparatus for peripheral device is securable by wrapped engagement of each of a plurality of elongate flexible members, pivotally disposed upon the apparatus, around a user's limb or other object around which said plurality of elongate flexible members is securable, as will be described subsequently herein below.

The present ergonomically configured handle apparatus for peripheral device 10, therefore, includes an obverse side 20 and a reverse side 22. A contact portion 30 is disposed for seating engagement with a peripheral device 500 upon the obverse side 20 and a circular contact surface 32, centrally disposed upon the contact portion 30, effects securable contact with a peripheral device 500 positioned thereagainst. The contact surface 32 may include a magnet, a suction cup, or some other attachment means whereby selective attachment to a peripheral device 500 is enabled.

A first bridge portion 34 is disposed projected from one side of the contact portion 30. The first bridge portion 40 is disposed flared from a minimum width proximal the contact portion 30, to a maximum width disposed distal the contact portion 30 at a first arced edge 42. The first arced edge 42 delimits a sector of a circle circumferentially bounding the contact portion 30.

A second bridge portion 50 is disposed projected from the other side of the contact portion 30 opposite the first bridge portion 40. The second bridge portion 50 is disposed flared from a minimum width proximal the contact portion 30, which minimum width is wider than the minimum width of the first bridge portion 40, and a maximum width disposed at a second arced edge 52 disposed distal the contact portion 30. The second arced edge 52 delimits a larger sector of a circle circumferentially bounding the contact portion 30.

Each of the contact surface 32 and the first and second bridge portions 40, 50 are disposed in a like plane whereby contact of a peripheral device 500 to the contact surface 32 positions portions of the peripheral device 500 directly atop the first and second bridge portions 40, 50. The peripheral device 500 then overhands each of a first obverse surface 64 and a second obverse surface 74, as will be described subsequently.

An irregular lens-shaped thenar contact portion 60 is disposed edgewise upon the first bridge portion 40 bounding the first arced edge 42. The thenar contact portion 60 is ergonomically configured for engagement against a thenar of a user's hand when grasping the apparatus 10. The thenar contact portion 60 includes a thenar contact surface 62 disposed on the reverse side 22 of the thenar contact portion 60 in a position to abut the thenar of a user's hand when grasping the apparatus 10; a sloped first obverse surface 64 disposed upon the obverse side 20 of the thenar contact portion 60, said first obverse surface 64 disposed sloping away from the first arced edge 42 towards the reverse side 22, whereby a peripheral device 500 attached at the contact surface 32 of the apparatus 10 overhangs the first obverse surface 64; and a first lateral surface 66 angularly disposed between the thenar contact surface 62 and the sloped first obverse surface 64.

For comfort wielding the device 10, and to accommodate the user's thumb recessed into the first obverse surface 64 to prevent contact with the peripheral device 500 when attached thereover, a pollex recess 68 is disposed upon the first lateral surface 66 and extends from the reverse side 22 into the first obverse surface 64 to terminate proximal the first arced edge 42. The pollex recess 68 is ergonomically configured to accommodate the thumb of a user when grasping the thenar contact portion 60 whereby a distal phalanx of the user's thumb is disposed recessed into the first obverse surface 64 proximal the first arced edge 42 to thereby avoid contact with the peripheral device 500 when attached to the apparatus 10, and a proximal phalanx of the user's thumb is disposed cradled in the pollex recess 68 upon the first lateral surface 66.

For engagement with the distal palmer and fingers of a user, an irregular crescent-shaped digital contact portion 70 is disposed edgewise upon the second bridge portion 50 around the second arced edge 52. The digital contact portion 70 is ergonomically configured for engagement against a distal palmer and fingers of a user. The digital contact portion 70 includes a palmer contact surface 72 disposed upon the reverse side 22 of the digital contact portion 70; a sloped second obverse surface 74 disposed upon the obverse side 22 of the digital contact portion 70, said sloped digital obverse surface 74 disposed sloping away from the second arced edge 52 towards the reverse side 22; and a second lateral surface 76 angularly disposed between the palmer contact surface 72 and the sloped second obverse surface 74.

A plurality of digital recesses 78 is disposed serried upon the second lateral surface 76, each of said plurality of digital recesses 78 extended from the reverse side 22 and onto the sloped second obverse surface 74 to terminate proximal the second arced edge 52. Each of said digital recesses 78 is ergonomically configured to accommodate an associated finger of the user when grasping the digital contact portion 70 whereby each distal phalanx of each finger of the user is disposed recessed into the second obverse surface 74 proximal the second arced edge 52 (and thus accommodated underneath a peripheral device when attached to the contact portion) and each proximal phalanx of each finger of the user is disposed cradled in each digital recess 78 upon the second lateral surface 76.

It should be noted by anyone having ordinary skill in the art that the thenar contact portion 60 and digital contact portion 70 may act as a base to uphold a peripheral device 500 above an underlying surface. The thenar contact portion 60 may, therefore, be flattened along the thenar contact surface 62 and the digital contact portion 70 may be flattened along the palmer contact surface 72 in like plane relative the theanr contact surface 62 whereby the apparatus 10 may be stood thereupon with a center of mass disposed through the contact portion 30. Similarly, securement of a peripheral device 500 off-center attached to the contact surface 32 may enable position of the peripheral device 500 diagonally upended upon an underlying surface whereby either the first or second lateral surface 66, 76 contacts the underlying surface to maintain the peripheral device 500 in a diagonal upended situation, as desired. This is particularly useful when viewing the peripheral device 500 attached to the apparatus 10.

In at least one embodiment contemplated as part of this disclosure attachment of the apparatus 10 to an object is enabled by action of each of a plurality of elongate flexible members 80 disposed securable between an extended position and a curled position. The plurality of elongate flexible members 80 includes a first elongate flexible member 82 pivotally disposed at a ball and socket joint 92 disposed at the first lateral surface 66 and each of a pair of second elongate flexible members 84 pivotally disposed at an associated ball and socket joint 94 disposed upon the second lateral surface 76. Each of the plurality of elongate flexible 80 members is rotationally disposed at the associated ball and socket joint 92, 94 whereby each of said plurality of elongate members 80 may be deployed through an angular radius to effect securement of the apparatus 10 to a user's limb, say, or to an object around which each of the plurality of elongate flexible members 80 may be secured in the curled position. Thus a user may wear a peripheral device 500, for example, secured to said user's wrist, say, for hands-free portage, as desired.

In at least one embodiment of the present device 10, at least one tactile cursor control 100 is disposed for manual engagement by the user grasping the thenar contact portion 60 and the digital contact portion 70. The at least one tactile cursor control 100 is disposed to communicate manual movements effected by the user to the peripheral device 500 attached at the contact surface 32 whereby navigation and selection of data displayable upon the peripheral device 500 is enabled in the hand of a user.

The at least one tactile cursor control 100 includes at least one directionally sensitive member 102 sensible of manual movement effected through 360° and at least one button 104 depressible between a default position and a depressed position whereby a user may navigate through data displayable onscreen and select data displayable thereon by depression of the at least one button 104. The at least one tactile cursor control 102 may be disposed in the pollex recess 68, proximal the first arced edge 42, whereby a user may control said at least one directionally sensitive member 102 with said user's distal phalanx of said user's thumb. The at least one button 104 may be disposed in at least one of the plurality of digital recesses 78 whereby a user may effect depression (and thus selection of highlighted data onscreen) by pressure enacted by at least one finger.

The at least one directionally sensitive member 102 is sensitive of a user's manual movements through 360° and may include, for example, a pressure sensitive protuberance able to communicate pressure exerted thereagainst to effect movement of a cursor onscreen in a corresponding direction. Alternately, the at least one directionally sensitive member may include a ball rotational within a housing whereby rotation of the ball in any direction corresponds to movement of the cursor in an associated direction onscreen.

Alternately, the at least one directionally sensitive member may include sensitivity of a user's digit (whether thumb or finger) when positioned to obscure or otherwise interact with a sensor, whereby position of said user's digit upon, or in relation to, the at least one directionally sensitive member is communicable of an associated position or direction of the cursor onscreen of the peripheral device 500.

Manual movements controlling the at least one tactile cursor control 100 are contemplated to be wirelessly communicable to the peripheral device 500 via Near Filed Communication protocol, such as, for example, Bluteooth®. Attachment of the peripheral device 500 to the contact surface 32 may prompt or establish connection of the peripheral device 500 with the ergonomically configured handle apparatus for peripheral device 10, whereby user interaction and single-handed operation of the peripheral device is enabled when grasping the apparatus 10 secured to the peripheral device 500.

Further, a space 150 disposed behind the contact portion 30 and between each of the thenar contact portion 60 and the digital contact portion 70 is usable to port accessories therein and may be devised to accommodate headphones, ear buds, or other such accessories frequently employed in use with the peripheral device 500.

What is claimed is:

1. An ergonomically configured handle apparatus for peripheral device comprising:
    an obverse side;
    a reverse side;
    a contact portion;
    a contact surface disposed centrally upon the contact portion;
    a thenar contact portion disposed radially extended from the contact portion, said thenar contact portion comprising:
        a thenar contact surface disposed on the reverse side of the thenar contact portion;
        a first obverse surface disposed sloped from the obverse side towards the thenar contact surface;
        a pollex recess disposed recessed in the thenar contact portion, said pollex recess configured to ergonomically accommodate a pollex of a user;
    a digital contact portion disposed radially extended from the contact portion opposite the thenar contact portion, said digital contact portion comprising:
        a palmer contact surface disposed upon the reverse side of the digital contact portion;
        a second obverse surface disposed sloped from the obverse side towards the palmer contact surface; and
        a plurality of digital recesses disposed serried upon the digital contact portion, each of said plurality of digital recesses configured to ergonomically accommodate an associated finger of the user therein;
    wherein the contact surface attaches to a peripheral device to maintain said peripheral device upon the contact portion disposed overhanging each of the first obverse surface and the second obverse surface whereby the thenar contact portion and the digital contact portion enable comfortable wielding of the peripheral in the hand of a user.

2. The ergonomically configured handle apparatus for peripheral device of claim 1 wherein the contact portion further comprises:
    a first bridge portion disposed projected from one side of the contact surface to terminate at a first arced edge disposed conjunct the first obverse surface; and
    a second bridge portion disposed projected from the other side of the contact surface opposite the first bridge portion, said second bridge portion terminating at a second arced edge disposed conjunct the second obverse surface;
    wherein the peripheral device attached to the contact surface overlies the first bridge portion and the second bridge portion to overhang each of the first and second obverse surfaces.

3. The ergonomically configured handle apparatus for peripheral device of claim 2 wherein the thenar contact portion further comprises a first lateral surface disposed between the thenar contact surface and the first obverse surface and the digital contact portion further comprises a second lateral surface disposed between the palmer contact surface and the second obverse surface.

4. The ergonomically configured handle apparatus for peripheral device of claim 3 wherein the pollex recess is disposed upon the first lateral surface and extends from the thenar contact surface into the first obverse surface to terminate proximal the first arced edge whereby a distal phalanx of a thumb of the user is recessed and cradled in the pollex recess without contacting the peripheral device attached at the contact portion.

5. The ergonomically configured handle apparatus for peripheral device of claim 4 wherein each of the plurality of digital recesses is disposed upon the second lateral surface and extends from the palmer contact surface into the second obverse surface to terminate proximal the second arced edge whereby a distal phalanx of each finger of the user is recessed and cradled in an associated digital recess without contacting the peripheral device attached at the contact portion.

6. The ergonomically configured handle apparatus for peripheral device of claim 5 further comprising a plurality of elongate flexible members, each of said plurality of elongate flexible members devised to bend between an extended position and a curled position, said plurality of elongate flexible members comprising:
    a first elongate flexible member pivotally disposed at a ball and socket joint disposed at the first lateral surface; and
    each of a pair of second elongate flexible members pivotally disposed at each of an associated ball and socket joint disposed upon the second lateral surface;
    wherein each of the plurality of elongate flexible members is coaxially rotational and movable between the extended position and the curled position to secure to an object about which each of the plurality of elongate flexible members will curl.

7. The ergonomically configured handle apparatus for peripheral device of claim 6 further comprising at least one tactile cursor control disposed for manual engagement by the user grasping the thenar contact portion and the digital contact portion, said at least one tactile cursor control disposed to communicate manual movements effected by the user to the peripheral device attached at the contact surface whereby navigation and selection of data displayable upon the peripheral device is enabled by one hand of a user.

8. The ergonomically configured handle apparatus for peripheral device of claim 7 wherein the at least one tactile cursor control includes at least a directionally sensitive member sensible of manual movements through 360° and at least one button depressible between a default position and a depressed position.

9. The ergonomically configured handle apparatus for peripheral device of claim 8 to wherein the manual movements controlling the at least one tactile cursor control are wirelessly communicable to the peripheral device via Near Field Communication protocol.

10. An ergonomically configured handle apparatus for peripheral device comprising:
an obverse side;
a reverse side;
a contact portion;
a contact surface disposed centrally upon the contact portion;
a first bridge portion disposed projected from one side of the contact surface and terminating at a first arced edge;
a second bridge portion disposed projected from the other side of the contact surface opposite the first bridge portion, said second bridge portion terminating at a second arced edge;
a thenar contact portion disposed edgewise girding the first arced edge, said thenar contact portion comprising:
 a thenar contact surface disposed on the reverse side of the thenar contact portion;
 a first obverse surface disposed sloped from the first arced edge towards the thenar contact surface;
 a first lateral surface disposed between the thenar contact surface and the first obverse surface;
 a pollex recess disposed recessed in the first lateral surface and extended from the thenar contact surface to the first obverse surface to terminate proximal the first arced edge;
a digital contact portion disposed edgewise girding the second arced edge, said digital contact portion comprising:
 a palmer contact surface disposed upon the reverse side of the digital contact portion;
 a second obverse surface disposed sloped from the second arced edge towards the reverse side;
 a second lateral surface disposed between the palmer contact surface and the second obverse surface; and
 a plurality of digital recesses disposed serried upon the lateral surface, each of said plurality of digital recesses extended from the reverse side and onto the second obverse surface to terminate proximal the second arced edge;
wherein the contact surface attaches to a peripheral device to maintain said peripheral device upon the contact portion disposed overhanging each of the first obverse surface and the second obverse surface whereby the thenar contact portion and the digital contact portion provide comfortable wielding of the peripheral device in the hand of a user.

11. The ergonomically configured handle apparatus for peripheral device of claim 10 further comprising a plurality of elongate flexible members, each of said plurality of elongate flexible members devised to bend between an extended position and a curled position, said plurality of elongate flexible members comprising:
a first elongate flexible member pivotally disposed at a ball and socket joint disposed at the first lateral surface; and
each of a pair of second elongate flexible members pivotally disposed at an associated ball and socket joint disposed upon the second lateral surface;
wherein each of the plurality of elongate flexible members is coaxially rotational and movable between the extended position and the curled position to secure to an object about which each of the plurality of elongate flexible members will curl.

12. The ergonomically configured handle apparatus for peripheral device of claim 11 further comprising at least one tactile cursor control disposed for manual engagement by the user grasping the thenar contact portion and the digital contact portion, said at least one tactile cursor control disposed to communicate manual movements effected by the user to the peripheral device attached at the contact surface whereby navigation and selection of data displayable upon the peripheral device is enabled by one hand of the user.

13. The ergonomically configured handle apparatus for peripheral device of claim 12 wherein the at least one tactile cursor control includes at least a directionally sensitive member sensible of manual movements through 360° and at least one button depressible between a default position and a depressed position.

14. The ergonomically configured handle apparatus for peripheral device of claim 13 wherein the manual movements controlling the at least one tactile cursor control are wirelessly communicable to the peripheral device via Near Filed Communication protocol.

15. An ergonomically configured handle apparatus for peripheral device comprising:
an obverse side;
a reverse side;
a contact portion;
a circular contact surface centrally disposed upon the contact portion;
a first bridge portion disposed projected from one side of the contact portion, said first bridge portion disposed flared from a minimum width, disposed proximal the contact portion, to a maximum width, disposed distal the contact portion at a first arced edge, said first arced edge delimiting a sector of a circle circumferentially bounding the contact portion;
a second bridge portion disposed projected from the other side of the contact portion opposite the first bridge portion, said second bridge portion disposed flared from a minimum width proximal the contact portion, which minimum width is wider than the minimum width of the first bridge portion, and a maximum width disposed at a second arced edge disposed distal the contact portion, said second arced edge delimiting a larger sector of the circle circumferentially bounding the contact portion;
an irregular lens-shaped thenar contact portion disposed edgewise upon the first bridge portion around the first arced edge, said thenar contact portion ergonomically configured for engagement against a thenar of a user, said thenar contact portion comprising:
 a thenar contact surface disposed on the reverse side of the thenar contact portion;
 a sloped first obverse surface disposed upon the obverse side of the thenar contact portion, said first obverse surface disposed sloped away from the first arced edge towards the reverse side;
 a first lateral surface angularly disposed between the thenar contact surface and the sloped first obverse surface;
 a pollex recess disposed upon the lateral surface, said pollex recess extended from the reverse side and onto the sloped obverse surface to terminate proximal the first arced edge, said pollex recess ergonomically configured to accommodate the pollex of a user when grasping the thenar contact portion whereby a distal phalanx of the user is disposed recessed into the first obverse surface proximal the first arced edge and a proximal phalanx of the thumb of the user is disposed cradled in the pollex recess upon the first lateral surface;

an irregular crescent-shaped digital contact portion disposed edgewise upon the second bridge portion around the second arced edge, said digital contact portion ergonomically configured for engagement against a distal palmer and fingers of a user, said digital contact portion comprising:
- a palmer contact surface disposed upon the reverse side of the digital contact portion;
- a sloped second obverse surface disposed upon the obverse side of the digital contact portion, said sloped digital obverse surface disposed sloped away from the second arced edge towards the reverse side;
- a second lateral surface angularly disposed between the palmer contact surface and the sloped second obverse surface;
- a plurality of digital recesses disposed serried upon the lateral surface, each of said plurality of digital recesses extended from the reverse side and onto the sloped second obverse surface to terminate proximal the second arced edge, each of said digital recesses ergonomically configured to accommodate an associated finger of the user when grasping the digital contact portion whereby a distal phalanx of each finger of the user is disposed recessed into the second obverse surface proximal the second arced edge and a proximal phalanx of each finger of the user is disposed cradled in each digital recess upon the second lateral surface; and
- a plurality of elongate flexible members, each of said plurality of elongate flexible members devised to bend between an extended position and a curled position, said plurality of elongate flexible members comprising:
  - a first elongate flexible member pivotally disposed at a ball and socket joint disposed at the first lateral surface; and
  - each of a pair of second elongate flexible members pivotally disposed at an associated ball and socket joint disposed upon the second lateral surface;

wherein the contact surface attaches to a peripheral device to maintain the peripheral device upon the contact portion disposed overhanging each of the first obverse surface and the second obverse surface whereby the thenar contact portion and the digital contact portion provide comfortable wielding of the peripheral in the hand of a user and each of the plurality of elongate flexible members is movable between the extended position and the curled position to secure the peripheral device for use attached to an object or a limb of the user.

16. The ergonomically configured handle apparatus for peripheral device of claim 15 further comprising at least one tactile cursor control disposed for manual engagement by the user grasping the thenar contact portion and the digital contact portion, said at least one tactile cursor control disposed to communicate manual movements effected by the user to the peripheral device attached at the contact surface whereby navigation and selection of data displayable upon the peripheral device is enabled by one hand of the user.

17. The ergonomically configured handle apparatus for peripheral device of claim 16 where the at least one tactile cursor control includes at least a directionally sensitive member sensible of manual movements through 360° and at least one button depressible between a default position and a depressed position.

18. The ergonomically configured handle apparatus for peripheral device of claim 17 wherein the manual movements controlling the at least one tactile cursor control are wirelessly communicable to the peripheral device via Near Filed Communication protocol.

* * * * *